(12) United States Patent
Mendler

(10) Patent No.: US 6,443,125 B1
(45) Date of Patent: *Sep. 3, 2002

(54) HIGH EFFICIENCY VEHICLE AND ENGINE

(76) Inventor: Charles Mendler, 3522 Northampton St., NW., Washington, DC (US) 20015

( * ) Notice: Subject to any disclaimer, the term of this patent is extended or adjusted under 35 U.S.C. 154(b) by 0 days.

This patent is subject to a terminal disclaimer.

(21) Appl. No.: 09/053,025

(22) Filed: Apr. 1, 1998

Related U.S. Application Data

(63) Continuation-in-part of application No. 08/443,164, filed on May 17, 1995.

(51) Int. Cl.[7] .................................................. F01L 1/34
(52) U.S. Cl. ....................................................... 123/316
(58) Field of Search ........................................ 123/316

(56) References Cited

U.S. PATENT DOCUMENTS

| | | | | |
|---|---|---|---|---|
| 4,539,946 A | * | 9/1985 | Hedelin | 123/316 |
| 4,753,198 A | * | 6/1988 | Heath | 123/316 |
| 4,958,606 A | * | 9/1990 | Hitomi et al. | 123/316 |
| 5,020,487 A | * | 6/1991 | Krüger | 123/316 |
| 5,031,582 A | * | 7/1991 | Krüger | 123/316 |
| 5,123,388 A | * | 6/1992 | Kanesoka | 123/316 |

* cited by examiner

Primary Examiner—Noah P. Kamen

(57) ABSTRACT

The efficiency of a vehicle having a body and a reciprocating piston four-stroke internal combustion engine is increased substantially by greatly reducing the size of the engine relative to the weight of the body. The great reduction in engine size relative to the weight of the body causes the engine to operate in a much more efficient range during almost all of the time of its operation. Peak power needs are satisfied by supercharging and varying the compression ratio. In a preferred embodiment, during idle and light engine loads, the power output of the engine is controlled while a steady engine rotational speed is maintained.

22 Claims, 10 Drawing Sheets

HIGH EFFICIENCY VEHICLE AND ENGINE

CROSS REFERENCE TO RELATED APPLICATION

This is a continuation-in-part of Ser. No. 08/443,164, filed on May 17, 1995.

BACKGROUND OF THE INVENTION

The present invention relates to a system for improving the fuel economy of vehicles, and more specifically to a system for improving the low-load efficiency of automotive spark-ignition four-stroke internal-combustion engines.

The maximum power capability of typical vehicle engines is significantly greater than the average power actually used while driving. On average, new cars sold today in the United States can deliver a maximum power of approximately 100 kilowatts. For most drivers, however, the average power actually used during city and highway driving is approximately 10 kilowatts. This can be appreciated from the stepped line in prior art FIG. 1, in which engine power output is shown on the abscissa, or horizontal, axis, and the percent of total driving time spent at a given engine power level for a typical driver and vehicle is read from the left ordinate axis. The low average power use is a problem, because conventional vehicle engines have poor efficiency when operated at light power levels. Since vehicle engines are operated most of the time at light power levels, fuel economy is poor. The efficiency of a typical prior art vehicle engine relative to engine power output is shown by the curved line in FIG. 1, in which brake engine efficiency is read from the right ordinate axis. As can be appreciated from FIG. 1, prior art engines are operated at low efficiency most of the time.

The problem of poor light load engine efficiency has been known for some time. In 1958 the Society of Automotive Engineers (SAE) published "Determination of True Engine Friction," SAE Trans., Vol. 66, pp. 649–661 which deals with engine friction losses, which are an important cause of poor light-load engine efficiency. Engine friction losses, which include mechanical sliding friction and aerodynamic pumping losses have only marginally improved since 1958. Today, typical new midsize passenger cars have an engine efficiency of approximately 18.2% during urban driving and 25.6% during highway driving, according to the 1994 Program Plan of Partnership for a New Generation of Vehicles (PNGV), a United States government and industry partnership including the major U.S. automobile manufacturers.

The PNGV was formed in 1993 to attempt development within ten years of one or more production prototype vehicles having a fuel economy of up to three times that of today's passenger cars. Methods of significantly increasing fuel economy are described in "The USDOE Propulsion Research and Development Program", *Transportation and Global Climate Change,* 1993, and in "Inventions Needed", PNGV, March 1995. Fuel economy and exhaust emission levels can be improved with a hybrid power train. Hybrid vehicles are characterized as having one, typically very small, engine that efficiently generates for the vehicle the base load power requirement of approximately 10 kilowatts. In hybrid vehicles, the base load engine is unable to deliver the maximum power requirements of the vehicle. Consequently, a second engine or motor is employed to permit the hybrid system to deliver maximum power needs. Problems with hybrid power systems include the cost of two power sources, complexity and bulk.

FIG. 3 shows generally engine size relative to vehicle weight for various types of vehicles. Vehicle weight divided by engine cylinder displacement, W/D in units of kilograms per liter, is shown on the abscissa axis. Engine maximum power output divided by engine cylinder displacement P/D, in units of kilowatts per liter, is shown on the ordinate axis. A vehicle power to weight ratio of 0.055 kW/kg is represented by the line E, which indicates generally the lower bound of power and thus acceleration for vehicles sold today in the United States. Thus, this is considered to be the minimum ratio for providing suitable acceleration. Some very low power European city cars fall below line E. Race and exotic performance cars fall in area A of the diagram; conventional passenger cars are in area B; Japanese micro cars fall in area b; and hybrid vehicles described above fall in area C. All, or virtually all, passenger cars sold world wide and having a vehicle power to weight ratio greater than 0.055 kW/kg are in areas B and b. The curved line T is intended to represent the historical trade-off of power vs. efficiency for vehicle engines, from vehicles having high fuel economy in the lower right of the diagram, to vehicles having high performance in the upper left corner of the diagram. The area C, which generally represents the primary engines of hybrid vehicles, is below line E. Consequently, hybrid vehicles require a secondary engine in order to provide the power to weight ratio and acceleration of vehicles sold today in the United States. As stated above, this secondary power source adds significant cost, complexity and bulk to the vehicle.

FIG. 4 is similar to FIG. 3, except that it shows on the abscissa axis a ratio of compression ratio times vehicle weight to combustion chamber volume Cr(W/d), rather than vehicle weight to engine cylinder displacement, W/D. In general, FIG. 4 relates to the combustion chamber volume rather than the cylinder displacement, and thus more precisely indicates automobile fuel economy than FIG. 3. Cr is the maximum compression ratio of the engine and d is the minimum combustion chamber volume of the engine. All passenger cars shown in FIG. 3 and having a vehicle power to weight ratio greater than 0.055 kW/kg are shown in FIG. 4. Dot H represents one hybrid vehicle, and is located below line e. As stated above, hybrid vehicles require a secondary engine in order to provide the power to weight ratio and acceleration of vehicles sold today in the United States. This secondary power source adds significant cost, complexity and bulk to the vehicle.

In a laboratory environment, direct injection diesel engines have demonstrated potential for attaining fuel efficiencies almost as high as those of hybrid power trains. While it may be possible to attain the PNGV mileage objectives with an advanced diesel engine, the exhaust emission levels of these diesel engines are unacceptable.

Another approach that has been attempted for improving non-hybrid power train engine efficiency is variable compression ratio. A variable compression ratio systems tested by Volkswagen is described in SAE paper No. 870610. Variable compression ratio systems with variable valve timing are described in U.S. Pat. No. 5,255,637 issued to M. M. Schechter, and in SAE paper No. 950089, February 1995, by M. M. Schechter et al., and in *Automobile Technology of the Future,* pp. 101–106, SAE, 1991. Variable compression ratio mechanism have been known for some time, and are described in SAE paper No. 640060, published in 1963, and SAE paper No. 901539 published in 1990. The general type of variable compression ratio mechanism used by Schechter was invented by the British Internal-Combustion Engine Research Institute (BICERI) in circa 1959. In prior art spark-ignition variable compression ratio engines, compression ratio is increased at light loads where the tendency of an engine to knock is at a minimum. Since thermodynamic efficiency increases with increasing compression ratio, one would expect increasing the compression ratio to increase light-load engine efficiency. However, the combustion chamber surface area to volume ratio also increases, which results in higher combustion chamber heat loss levels, which can be appreciated from prior art FIG. 10. Prior art FIG. 10 shows combustion chamber surface area on the vertical axis and engine power output at a certain engine speed on the horizontal axis. The surface area to combustion chamber volume ratio of typical vehicle engines is represented by cross hatched box 100. The surface area to combustion chamber volume ratio of a variable compression ratio engine is represented by line 102. As can be appreciated from FIG. 10, at light power levels, combustion chamber surface area increases significantly for these variable compression ratio engines, which results in increased heat loss from the combustion chamber, which adversely effects vehicle fuel economy. Also in these variable compression ratio engines, there is only minimal reduction of mechanical sliding frictional power loss and little or no reduction of aerodynamic pumping loss. Consequently, variable compression ratio has provided only limited gains in engine efficiency and vehicle fuel economy.

This efficiency can be improved somewhat by employing variable valve control, which reduces aerodynamic pumping loss and which provides the engine with a greater effective expansion ratio than effective compression ratio at light loads. Engines employing both variable compression ratio and variable valve control, described in SAE paper No. 820352, 1982, and SAE paper No. 950089, and in *Automotive Technology of the Future* have been known for some time and are referred to generally as OA engines because they operate under the Otto-cycle at high load to attain high power output, and under the Atkinson cycle at light load to attain high efficiency. OA engines have demonstrated light load fuel economy improvement of approximately 12 to 15%. This is a small increase in fuel economy relative to the increased cost of the engine.

In U.S. Pat. No. 5,255,637 the variable compression ratio engine has the same displacement as a conventional turbocharged engine but includes variable valve control with the turbocharging. It discloses that variable valve control permits elimination of the waste gate and turbocharging increases engine power, but at the expense of efficiency. This arrangement addresses the consumer interest of increased power with minimized loss of fuel economy, described in SAE paper No. 901539.

A further problem with variable compression ratio engines is that of increased hydrocarbon emission levels caused by heat loss from the combustion charge, which results in incomplete combustion of the fuel-air mixture. These engines have high heat loss because of the high surface area to volume ratio of the combustion chamber at light engine loads, as shown in FIG. 10. SAE paper No. 950089, discloses a 24% to 60% increase in hydrocarbon emissions with its variable compression ratio engine. It should be noted that a 50% reduction in hydrocarbon emissions is required for current Tier I automobiles to attain the Tier II hydrocarbon emissions targets, and approximately an 80% reduction in hydrocarbon emissions to attain the California ULEV emission standard which takes effect in 1997. Hydrocarbon emissions are most sever during engine starting because the engine is cold and the catalytic converter is below its light off temperature.

Yet a further problem with prior art variable compression ratio engines is that of transient engine knock. Specifically, rapid reduction of compression ratio, from for example 15:1 to 9.5:1, is important for avoiding transient knock. SAE paper No.950089 discloses that "the most critical piece of hardware needed to create the OA engine is the VCR [variable compression ratio] piston. A VCR piston was built and tested, and although it did function, the response rate was slower than required. Significant development is needed to resolve issues." Because of the problem of transient engine knock, these variable compression ratio engines require a faster acting variable compression ratio mechanism.

It has been known that engine efficiency can be improved by reducing the size of the engine relative to the size of the vehicle. This has the effect of operating the engine at a higher load, where friction losses are relatively lower. The National Research Council reports in *Automotive Fuel Economy*, National Academy Press, 1992, pp. 204–205, that a 10% reduction in size of a conventional engine yields a fuel economy improvement of approximately 3.2%. Similarly, SAE paper No. 940198 shows (in FIG. 13 of the paper) that a 10% reduction in engine size yields approximately a 4.3% improvement in fuel economy, and SAE paper No. 950811 shows that a 10% reduction in engine size yields a fuel economy improvement of approximately 3.4%. These values are very close to one another given the variability, such as cylinder count, of engine configurations. A 3.2% to 4.3% gain in fuel economy for a 10% percent reduction in engine size is a relatively small improvement.

Of course, a problem with reducing engine size is that power is also reduced. Engine power can be recovered by increasing air intake through the use of more than the standard one intake valve and one exhaust valve per cylinder. However, this approach enables only a limited reduction in engine size, approximately 10%, with out loss of power. Approximately an additional 2.0% gain in efficiency is realized with the four valve per cylinder engine, however, due to better spark plug placement. While this is a valuable improvement in fuel economy, reducing engine size by more than approximately 10% would compromise vehicle power and acceleration. It has been known for some time that the power of an internal combustion engine can be increased by turbocharging or supercharging. Turbocharging of a spark-ignition internal combustion engine requires the compression ratio to be reduced in order to avoid knock. Lowering the compression ratio, however, reduces thermodynamic efficiency, which offsets efficiency gains realizable from using a smaller engine. Accordingly, the benefit of engine downsizing becomes smaller, and of less or no value, with each additional incremental reduction of engine size. Consequently, turbocharging is expensive relative to the amount of fuel economy improvement that is realized by engine downsizing. In SAE paper No. 950811, March 1995, Lotus Engineering discusses technologies that enable engine size reduction for improved fuel economy. Lotus Engineering does not recommend use of turbocharging for improving fuel economy. According to Lotus Engineering, an additional problem with turbocharging is that fuel enrichment is currently employed to prevent overheating of the turbocharger during periods of high power output, and that this fuel enrichment produces high emission levels. Turbine overheating and the need for fuel enrichment can be avoided or delayed by water cooling the turbocharger and/or using a ceramic turbine, but these options add cost. Accordingly, turbocharging is expensive relative to the amount of fuel economy improvement realized.

With regard to engine displacement and cylinder count, mass production light-duty vehicles sold in the U.S. have engines with three or more cylinders. In general, these light-duty vehicles have four or more cylinders, where only a small fraction of one percent of passenger cars sold in the U.S. have engines with only three cylinders. Problems with three cylinder engines (and to a much larger extent two and one cylinder engines) include torsional and shaking vibration, and low power, especially at low engine speeds. Light-duty vehicle models, or groups of models that are largely the same, that are sold in volumes greater than 500 units per year, and that can legally be operated on the highway, are considered mass production light-duty vehicles.

Torsional vibration of the engine's crankshaft can be mitigated by using a larger flywheel. However, use of a large flywheel also impedes the engine from quickly revving up to a high rotational speed where the engine produces greater power and provides greater torque at the drive wheels. Reduced engine responsiveness is a significant disadvantage for using a large flywheel in a small engine considering that power output and torque at the drive wheels is exceptionally small for small engines operating at low rotational speeds.

Engines having three or more cylinders can employ significantly smaller flywheels than two and one cylinder engines due to the greater frequency of engine firing and the significantly smaller level of torsional vibration of the engine's crankshaft. Consequently, engines having three or more cylinders have a faster response and/or less torsional vibration of the crankshaft than two and one cylinder engines of equal displacement. The flywheel is primarily required to provide a smooth engine idle and smooth running at low engine speeds. At higher engine speeds, the rotational inertia of the engine is greater, and torsional vibration is greatly reduced.

Engine responsiveness is a significant problem with using fewer than three engine cylinders, primarily because a fast engine responsiveness is needed due to the low power levels of the smaller engine and because a large flywheel is required to reduce torsional vibration. The inertia of the flywheel prevents the engine from quickly attaining high rotational speeds where the engine produces higher power and torque levels at the drive wheels, necessary for vehicle launch and acceleration at low road speeds. Another disadvantage of one and two cylinder engines is shaking vibration. Single cylinder engines have the worst levels of torsional vibration. Shaking vibration is generally the most severe for single cylinder engines. However, shaking vibration can be approximately as severe in some two cylinder engines.

SUMMARY OF THE INVENTION

By the present invention, a single cylinder reciprocating piston four-stroke internal-combustion engine, much smaller in total engine displacement than conventional for the size of the vehicle, is employed in the vehicle for attaining high efficiency, and is power boosted for attaining maximum power. The engine includes variable compression ratio and adjustable valve actuation to reduce torsional vibration of the engine at low engine speeds, enabling the flywheel inertia to be minimized and in turn enabling the single cylinder engine to quickly rev up to higher engine speeds for producing high power and torque at the drive wheels of the vehicle. The displacement of the engine is greatly reduced to reduced the magnitude of the of the torsional and shaking vibration at idle and low engine speeds. According to the present invention, a single cylinder is employed to minimize frictional and pumping losses, and to maximize vehicle fuel economy. Supercharging is increased to make up for the power lost by reductions in engine displacement. The present invention is especially applicable to mass production passenger cars.

In a four-stroke engine, torsional vibration is caused first by a significant increase in crankshaft rotational speed during the power stroke of the engine, and second by a significant decrease in engines rotational speed during the intake and compression strokes of the engine. According to the present invention, adjustable valve actuation and variable compression ratio are employed to reduce acceleration and deceleration of the engine's crankshaft.

According to the present invention, adjustable valve actuation and variable compression ratio are employed to reduce the size of the combustion charge at low engine speeds. The smaller combustion charge acts with less force on the piston, enabling the engine to idle with less torsional vibration.

Regarding deceleration of the engine's crankshaft, the rotational speed of the engine is slowed by the manifold vacuum acting on the piston during the intake stroke. At idle, the manifold vacuum contributes significantly to slowing the engine. Additionally, the manifold vacuum causes pumping losses, which requires the force of the combustion charge to be increased in order to simply sustain idle speed. In the present invention, adjustable valve actuation is employed to reduce engine throttling and manifold vacuum on the piston during intake. Accordingly, the rotational speed of the engine is slowed less during the intake stroke relative to a throttled engine.

Reducing engine throttling and thus reducing pumping losses directly reduces crankshaft torsional vibration by reducing the deceleration of the engine's crankshaft during the intake stroke. Reducing engine throttling and pumping losses indirectly reduces crankshaft torsional vibration by reducing the size of the combustion charge that is required to sustain engine idle. Accordingly, crankshaft torsional vibration is reduced at idle by reducing pumping loss and by reducing combustion charge size, which results in less deceleration and acceleration of the crankshaft respectively.

Rather than increase the displacement of the small engine to increase torque and responsiveness at low engine speeds, the displacement of the engine is further reduced to reduced the magnitude of the of the torsional and shaking vibration at idle and low engine speeds. In detail, the smaller engine has less vibration relative to the mass and damping provide by the vehicle, and as a consequence a relatively small flywheel can be employed. Supercharging is increased to make up for the power lost by the additional reductions in engine displacement.

In summary, the high efficiency vehicle and engine, according to the present invention, has a single cylinder and a smooth idle. The high efficiency vehicle and engine includes variable compression ratio, adjustable valve actuation, and supercharging. The engine can accelerate quickly to high rotational speeds for providing high power and high torque at the drive wheels of the vehicle, and in particular at low vehicle speeds such as during vehicle launch.

The cost of the small variable compression ratio supercharged engine is significantly less than the cost of an additional motive power source and associated power train which are used in hybrid vehicles, and is competitive in price with conventional engines of comparable power.

The size of the engine is greatly reduced relative to the size of the vehicle in order to minimize the effect of engine friction losses and to maximize vehicle fuel economy. Supercharging and variable compression ratio are employed to satisfy maximum power requirements without detracting from light load engine efficiency. The variable compression ratio supercharged engine attains approximately the same fuel economy as the hybrid vehicle's primary engine in the same automobile, but at significantly less cost, complexity, weight and bulk than the hybrid system.

As can be appreciated from FIG. 4, no, or virtually no, supercharged spark-ignition passenger car engines are sold anywhere that have a compression ratio times vehicle weight to combustion chamber displacement ratio Cr(W/d) greater than 75000 kg/L and a power to weight ratio greater than 0.055 kW/kg, because the cost of the supercharging equipment adds significantly to the cost of the engine, and the fuel economy benefit from downsizing these supercharged engines is small. Accordingly, the ratio of the cost of downsizing with supercharging to the fuel economy benefit from engine downsizing is poor for prior art passenger car engines.

Referring now to FIG. 9, supercharged engines employing variable compression ratio, line 94, are unusual in that the rate of efficiency improvements realized by engine downsizing grows rather than levels off as is the case with conventional supercharged engines, line 90. The variable compression ratio supercharged engine of the present invention is expected to attain up to approximately 60% better fuel economy than conventional spark ignition vehicle engines in the same automobile. The engine of the present invention is much smaller than conventional engines for the same vehicle in order to attain optimum fuel economy and a good downsizing cost to fuel economy benefit ratio. The five significant problems associated with prior art variable compression ratio engines—high heat loss from the combustion chamber due to the chamber's high surface area to volume ratio, no significant reduction in mechanical sliding friction, high cost, transient engine knock, and hydrocarbon emissions—are avoided by varying the compression ratio of a small engine, rather than increasing the light-load efficiency of a conventional size engine.

Due to its small cylinder displacement and small combustion chamber volume, at light power levels, the engine according to the present invention will operate approximately as efficiently as a hybrid vehicle's primary engine. As can be appreciated from FIGS. 4 and 11, the combustion chamber has a favorable surface area to volume ratio and the geometry of the chamber is optimum for attaining high light—load engine efficiency. Consequently, heat loss, pumping loss and mechanical friction losses are at a minimum relative to engine power output at low power levels.

As described previously, FIG. 4 is similar to FIG. 3, except that it shows on the abscissa axis a ratio of compression ratio times vehicle weight to combustion chamber volume Cr(W/d), rather than vehicle weight to engine cylinder displacement, W/D. Cr is the maximum compression ratio of the engine and d is the minimum combustion chamber volume of the engine. The ordinate axis of FIG. 4 shows a ratio of engine maximum power output divided by combustion chamber volume, multiplied by compression ratio, rather than engine maximum power output divided by cylinder displacement, in order to have compatible units with the abscissa axis. Consequently, line e corresponds generally to line E in FIG. 3, and has a value of 0.055 kW/kg. All passenger cars shown in FIG. 3 and having a vehicle power to weight ratio greater than 0.055 kW/kg are shown in FIG. 4.

The cost additions of the supercharger, variable compression ratio system, and stronger engine crankshaft and pistons to bear higher loads are largely offset by cost savings realized by producing a much smaller engine. Specifically, significant cost savings can be realized by reducing current engine size by at least one half, using as a base line current high sales volume vehicles, which have a compression ratio times vehicle weight to combustion chamber volume ratio Cr(W/d) of approximately 50000 kg/L as shown in FIG. 4, and a vehicle weight to engine displacement ratio W/D of approximately 600 kg/L as shown in FIG. 3. Most notably, significant cost offsets can be realized by replacing a four-cylinder engine with a single cylinder engine. The engine according to the present invention is competitive in price with conventional engines of comparable power. Moreover, a large reductions in engine size is cost effective according to the present invention, in contrast to an incremental reductions in engine size which provides only a small fuel economy benefit without any large cost offsets. The vehicle compression ratio times vehicle weight to combustion chamber volume ratio Cr(W/d) of the present invention is, at a minimum, 100000 kg/L. Referring now to FIGS. 4 and 9, line 36 has a value of 100000 kg/l, and equivalently 0.00001 L/kg. As can be appreciated from FIG. 12, with the variable compression ratio supercharged engine of the present invention, the rate of gain in engine efficiency at light power realizable by engine downsizing increases significantly to the left of line 36, where engine size has been reduced by about one-half as can be seen in FIG. 4.

At high engine loads, a supercharger delivers a large mass flow of air to the engine. Variable compression ratio is employed to increase the volume of the combustion chamber (s) of the engine at these high power levels in order to minimize stress in the engine and to avoid knock. At maximum power, the duration of high crankshaft loading is significantly increased, whereas the magnitude of maximum loading on the crankshaft is only marginally increased due to the variable compression ratio. Consequently, maximum engine power output is significantly increased with only moderate increase in maximum crankshaft loading. Referring now to FIG. 3, to avoid the necessity of a secondary power source, the supercharged variable compression ratio engine of the present invention will have a power output relative to vehicle weight ratio of at least 0.055 kW/kg.

Yet a further advantage of the present invention is that transient engine knock is substantially avoided. In known variable compression ratio engines, cylinder pressure rises almost immediately following opening of the air intake throttle. In these engines compression ratio cannot be reduced, from approximately 15:1 to 9.5:1, as rapidly as the throttle is opened, and consequently these engines experience transient knock. In the present invention, however, high light-load engine efficiency is attained at a compression ratio of approximately 9.5:1 because of the engine's small size. At a compression ratio of approximately 9.5:1, rapidly opening the throttle does not cause knock. Accordingly, the variable compression ratio mechanism must reduce compression ratio, from, for example from 9.5:1 to 8:1, only as fast as the supercharger is able to increase boost pressure. A pressure rise lag time is encountered with superchargers and in particular with turbochargers, that provides a buffer time for variable compression ratio mechanisms to adjust the engine's compression ratio, so that transient knock is substantially avoided in the present invention. The buffer time in the small engine of the present invention is long enough for permitting transient engine knock to be substantially avoided, but short enough to be not noticed by most drivers. Intercooling the pressure boosted intake air and adjusting the spark timing further increases the buffer time available for reducing compression ratio and, thus, preventing transient knock. A modest increase in peak compression ratio can be accommodated in the present invention with prior art variable compression ratio mechanisms, and this increase in peak compression ratio will provide a small, secondary, level of fuel economy improvement relative to the primary fuel economy benefit attained by greatly reducing engine size.

Exhaust emissions are greatest for conventional engines during the first 120 seconds of engine operation, because combustion is incomplete when the engine is cold, and because the catalytic converter is below its "light off" temperature. The engine of the present invention warms up significantly faster than conventional engines due to its smaller size, lower thermal inertia and higher power loading, or higher brake mean effective pressure. This yields significant reductions in cold start hydrocarbon emissions. Furthermore, as can be appreciated from FIG. 11, the variable compression ratio engine of the present invention has a favorable combustion chamber surface area to volume ratio at light power levels, and thus avoids high heat loss, and consequently high emission levels, at light power levels. Moreover in vehicles with an engine according to the present invention having approximately the same compression ratio as engines not employing variable compression ratio, emissions are also lower on a per mile basis than for known turbocharged and naturally aspirated engines due to the greater fuel economy and lower per mile fuel consumption of the present invention. Consequently, engines according to the present invention have lower hydrocarbon emissions than both conventional engines and known variable compression ratio engines. Furthermore, fuel enrichment, a major source of hydrocarbon emissions in prior art turbocharged engines, can be eliminated by using a mechanical supercharger, or can be largely avoided in the present invention by further lowering of the compression ratio and increasing engine intercooling. Another approach for eliminating the need for fuel enrichment, ceramic turbines, can be installed at low cost relative to the degree of fuel economy improvement that can be attained by engine downsizing, as can again be appreciated from FIG. 9.

The small size of the engine of the present invention enables the aerodynamics of the vehicle to be improved, which in turn improves fuel economy. The smaller weight of the engine also improves vehicle fuel economy. Hybrid power systems, by comparison, are significantly more expensive, heavier and bulkier than both the power-boosted engine of the present invention and conventional vehicle engines.

A small amount of engine downsizing yields a small benefit in fuel economy. However, the rate of fuel economy improvement increases significantly with greater engine downsizing with the supercharged variable compression ratio engine of the present invention. As can be appreciated from FIG. 9, the fuel economy benefit of engine downsizing tapers off to the left of line 36 for supercharged vehicle engines 90. However, for supercharged vehicle engines with variable compression ratio according to the present invention, line 94, engine efficiency rises rapidly to the left of line 36. The supercharged variable compression ratio engine of the present invention is expected to attain up to approximately 60% better fuel economy than conventional spark ignition vehicle engines in the same automobile. By greatly downsizing the engine for a given vehicle, a significantly improved fuel economy is achieved by the present invention and a favorable cost to benefit ratio is attained.

With the smaller engine according to the present invention, combustion chamber shape is optimum at light loads, and mechanical friction and pumping losses are at a minimum. Moreover, light-load engine efficiency is not strongly dependent on turbocharger or supercharger efficiency because the engine according to the present invention has a high compression ratio and an optimally shaped combustion chamber at light engine loads. Furthermore, exhaust gas recirculation can be employed to further reduce emissions and improve fuel economy.

Variable valve control can be used with the present invention to enhance the performance of the turbocharged spark-ignition engines. With variable valve control, the timing of valve opening, the valve lift and/or the valve opening duration is adjusted to control air intake into the cylinder of the engine and thus control maximum cylinder pressure and engine power. Power and fuel economy are both increased.

DETAILED DESCRIPTION OF THE PREFERRED EMBODIMENTS

Figure 1:
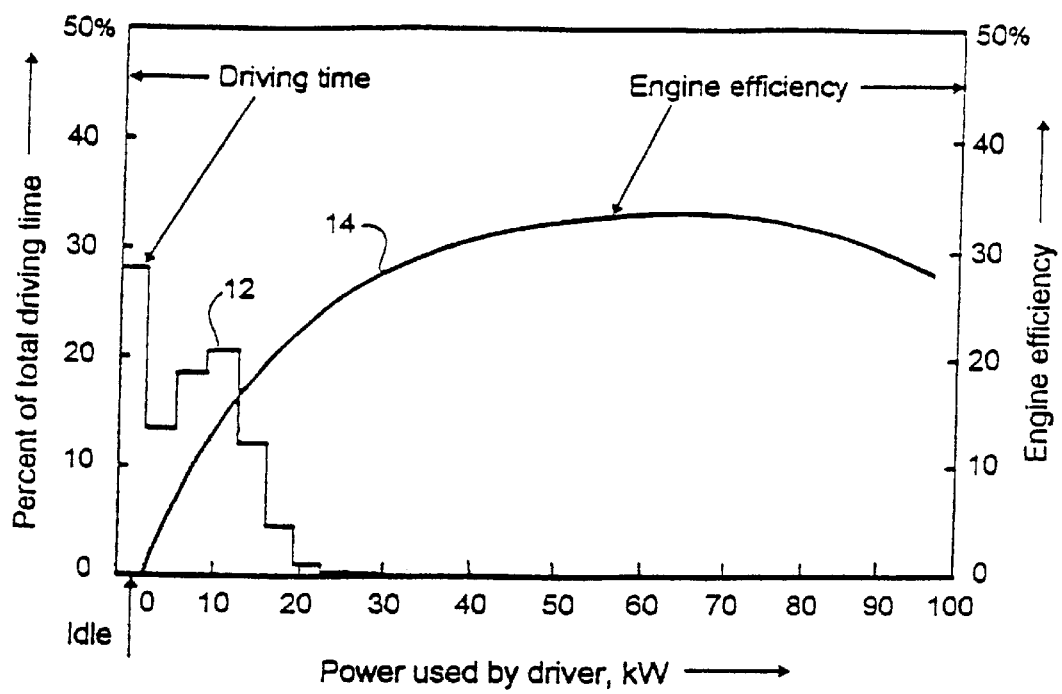
FIG. 1, already described, is a diagram relating the efficiency profile of a typical prior art automobile engine to the approximate percent of total driving time spent at a given power level.
Figure 2:
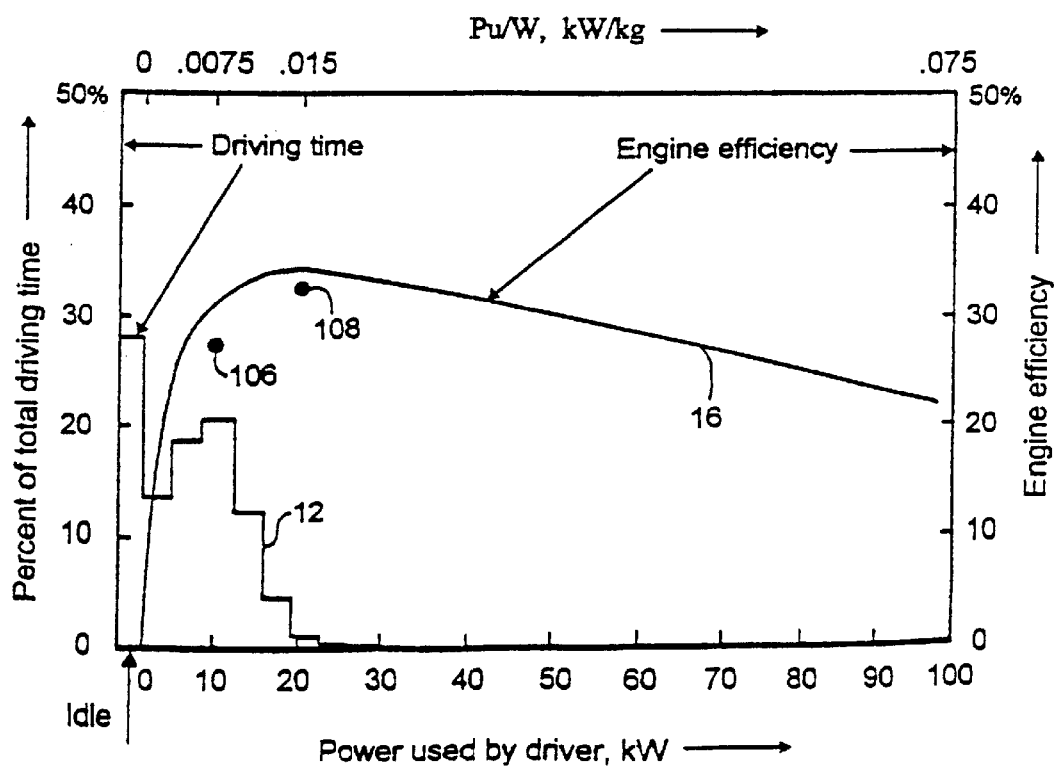
FIG. 2 is a diagram similar to that of FIG. 1 but showing the general engine efficiency profile of the present invention.

The percent of total driving time spent at a given engine power level for a typical driver and typical passenger car is illustrated by the stepped curve 12 in FIGS. 1 and 2. The maximum power of new cars sold in the United States, on average is approximately 100 kilowatts. The general efficiency profile of a typical prior art 100 kilowatt engine is represented by the curve 14 in FIG. 1. The general efficiency profile of a 100 kilowatt engine according to the present invention is represented by the line 16 in FIG. 2. In FIGS. 1 and 2, engine power output is shown on the abscissa axis. The percent of total driving time spent at a given engine power level is read from the left ordinate axis. Brake engine efficiency is read from the right ordinate axis. The cylinder displacement and combustion chamber volume of the engine according to the present invention are much smaller than those of a conventional engine having the same maximum power output. By comparing FIGS. 1 and 2, it can be seen that reducing engine cylinder displacement and reducing combustion chamber volume relative to vehicle weight according to the present invention shifts the efficiency profile of the engine to the left, thereby providing greater engine efficiency at light power levels. It can also be seen that the engine is significantly more efficient than typical engines at the power levels at which the engine operates most of the time. The greater efficiency occurs at every power level in at least the lower fourth in the range of power levels the engine is capable of producing. A small, optimally shaped combustion chamber volume is employed at light power levels to attain high fuel economy. Supercharging and variable compression ratio are employed to satisfy maximum power requirements without compromising light load engine efficiency. The power-boosted engine attains approximately the same fuel economy as hybrid vehicle's primary engine in the same automobile, but at significantly less cost, complexity, weight and bulk than the hybrid system.

Figure 3:
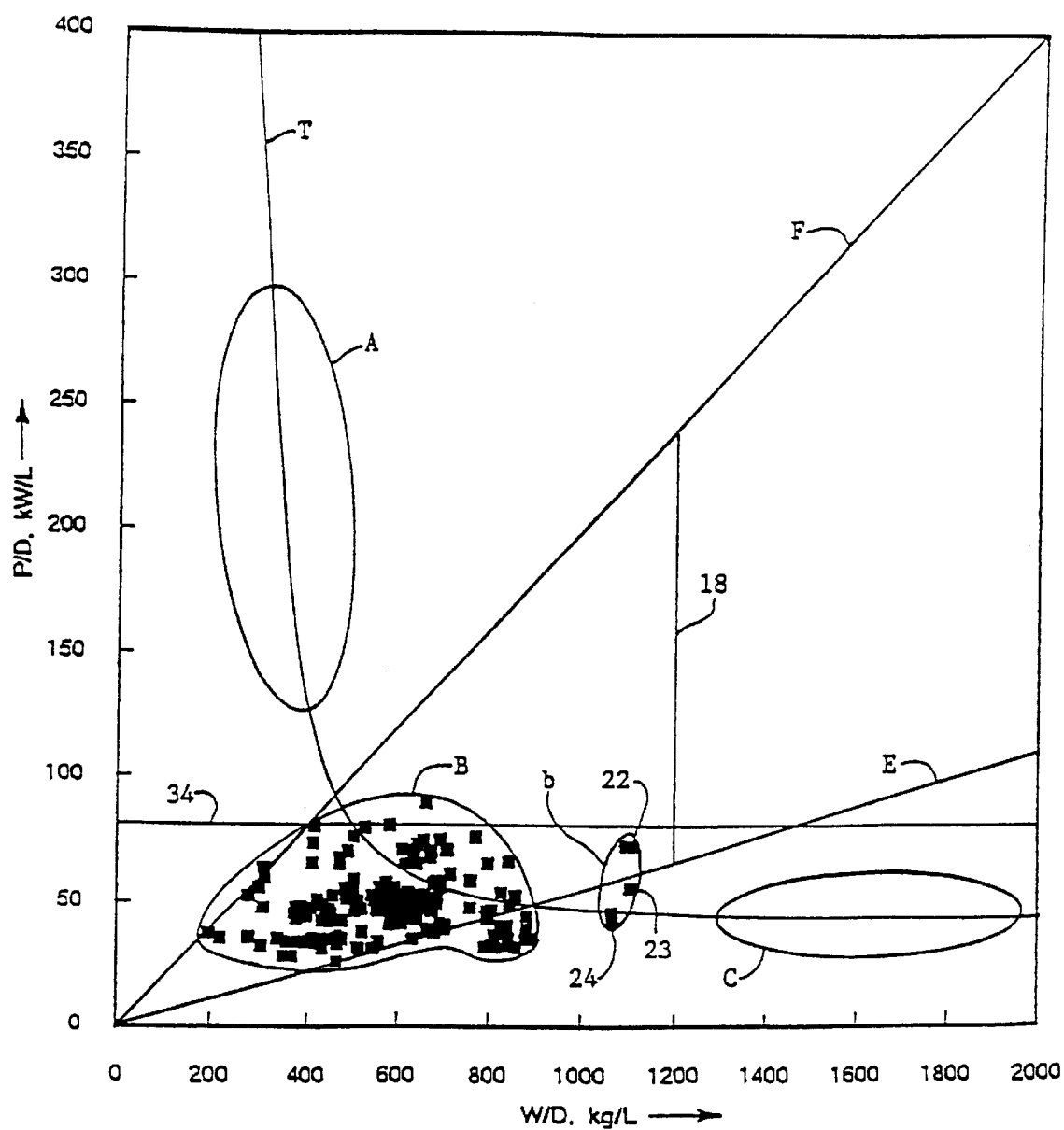
FIG. 3, already described, is a diagram showing engine power relative to engine displacement and automobile weight for various automobiles.
Figure 4:
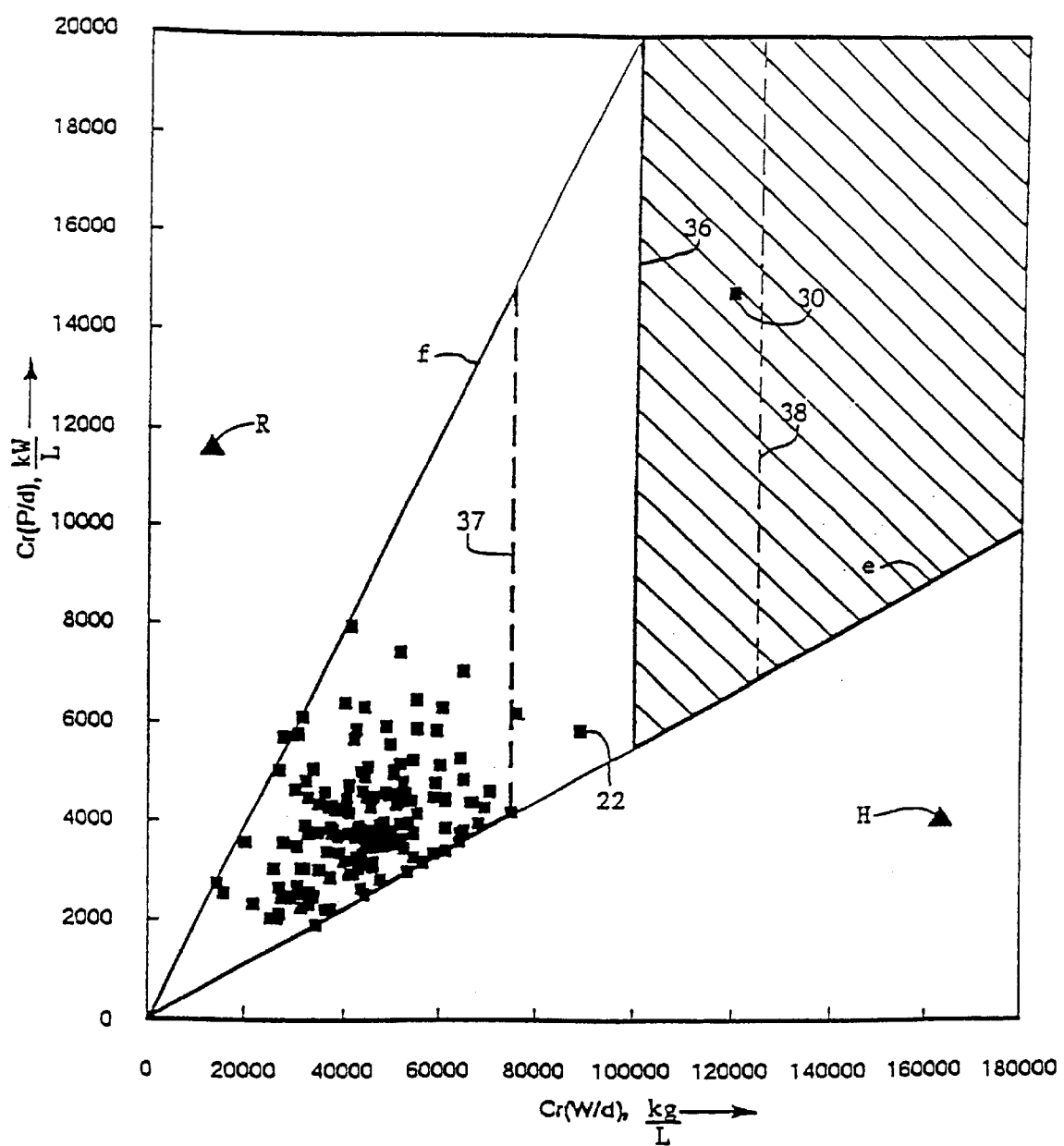
FIG. 4, already described, is a diagram similar to that of FIG. 3.

FIGS. 3 and 4 show generally engine size relative to vehicle weight for various types of vehicles. Referring now to FIG. 3, vehicle weight divided by engine cylinder displacement, W/D in units of kilograms per liter, is shown on the abscissa axis. Engine maximum power output divided by engine cylinder displacement, P/D in units of kilowatts per liter, is shown on the ordinate axis. A vehicle weight to displacement ratio of 0.055 kW/kg, represented by line E, is generally the lower bound of power and thus acceleration for automobiles sold today in the United States. Some very low power European city cars fall below line E. A vehicle power to weight ratio of 0.20 kW/kg is represented by the line F, which is generally the upper boundary of a power to weight ratio and, thus, a upper boundary of acceleration for vehicles sold in volume today. Race and exotic performance cars are in area A. Conventional production passenger cars are in area B and Japanese micro-size cars fall in area b. Dots 22, 23 and 24 represent specific micro-size vehicles designed to satisfy certain Japanese legal requirements relating to limited parking space, vehicle size, and engine displacement and power limitations. Dot 22 represents a naturally aspirated engine, and falls to the right of line 37 in FIG. 4. Dots 23 and 24 represent turbocharged engines and fall to the left of line 37 in FIG. 4 (not numbered in FIG. 4). The other dots represent actual production passenger cars. Virtually all passenger cars sold world wide having a vehicle weight to power ratio greater than 0.055 kW/kg are in areas B and b of FIG. 3. Line T represents the historical trade-off of power vs. efficiency for vehicle engines, from vehicles having high fuel economy on the lower right to vehicles having high performance in the upper left corner of the diagram. Area C shows hybrid engine size relative to vehicle weight. As can be seen, hybrid size engines are too far to the right on trade-off line T to provide acceptable vehicle acceleration. Consequently, in hybrid vehicles a secondary engine is employed to provide added power.

Vertical line 18 represents a vehicle weight to engine displacement ratio of 1200 kg/L. High efficiency vehicle and engines to the right of line 18 according to the present invention include supercharging and variable compression ratio in the preferred embodiment.

Vehicles according to the present invention have high fuel economy due to their small combustion chamber volume and large compression ratio at light loads. FIG. 4 is similar to FIG. 3, except that it shows on the abscissa axis a ratio of compression ratio times vehicle weight to combustion chamber volume, rather than vehicle weight to engine cylinder displacement. Cr is the maximum compression ratio of the engine and d is the minimum combustion chamber volume of the engine. The ordinate axis of FIG. 4 shows a ratio of engine compression ratio times maximum power output divided by combustion chamber volume, rather than engine maximum power output divided by cylinder displacement in order to have compatible units with the abscissa axis. Consequently, line e corresponds generally to line E in FIG. 3, and has a value of 0.055 kW/kg. Similarly, line f corresponds generally to line F in FIG. 3, and has a value of 0.20 kW/kg. The dot 30 represents one vehicles according to the present invention. Dot H represents a hybrid vehicle's primary engine; and dot R represents a high performance race car engine. All passenger cars shown in FIG. 3 and having a vehicle power to weight ratio of at least 0.055 kW/kg are shown in FIG. 4.

Vertical line 37 represents a compression ratio times vehicle weight to combustion chamber volume ratio, Cr(W/d), of 75000 kg/L. Supercharged vehicle engines fall to the left of line 37, and there are no, or virtually no, supercharged passenger cars sold world wide to the right of line 37 and having an engine maximum power to vehicle weight ratio of at least 0.055 kW/kg. Vertical line 36 shown in FIG. 4 represents a vehicle engine compression ratio times vehicle weight to combustion chamber volume ratio of 100000 kg/L. Vehicles engines to the right of line 36 in FIG. 4 according to the present invention include supercharging and variable compression ratio. These vehicle engines have high fuel economy due to their small combustion chamber volume and high compression ratio at light power levels, while also having high power, and therefore good acceleration, due to supercharging and variable compression ratio. Moreover, these variable compression ratio engine vehicles have fewer pistons and associated components and/or significantly smaller size. Accordingly, these vehicles can be manufactured at competitive cost.

Vehicles according to the present invention include supercharging and variable compression ratio, and have a compression ratio times vehicle weight to engine combustion chamber volume ratio, Cr(W/d), of at least 100000 kg/L, and an engine maximum power to vehicle weight ratio of at least 0.055 kW/kg. Thus, the vehicles according to the present invention lie in the crosshatched area in FIG. 4.

As can be appreciated from FIG. 3, no, or virtually no, vehicles are sold anywhere that have a power to engine displacement ratio P/D greater than 80 kW/L, represented by line 34, and a vehicle weight to engine displacement ratio greater than 900 kg/L. This is because above approximately 80 kW/L supercharging is generally required to attain high power output, and the cost of the supercharging equipment adds significantly to the cost of the engine. Moreover, the supercharging equipment is expensive relative to the small fuel economy improvement realized by downsizing of these prior art engines. Consequently, while supercharging is employed to attain high performance in cars that have a vehicle weight to engine displacement ratio less than 900 kg/L, no or virtually no passenger cars are sold anywhere that have an vehicle weight to engine displacement ratio greater than 900 kg/L and a power to engine displacement ratio greater than 80 kW/L, because the cost to fuel economy benefit of supercharging prior art engines is poor.

Figure 9:
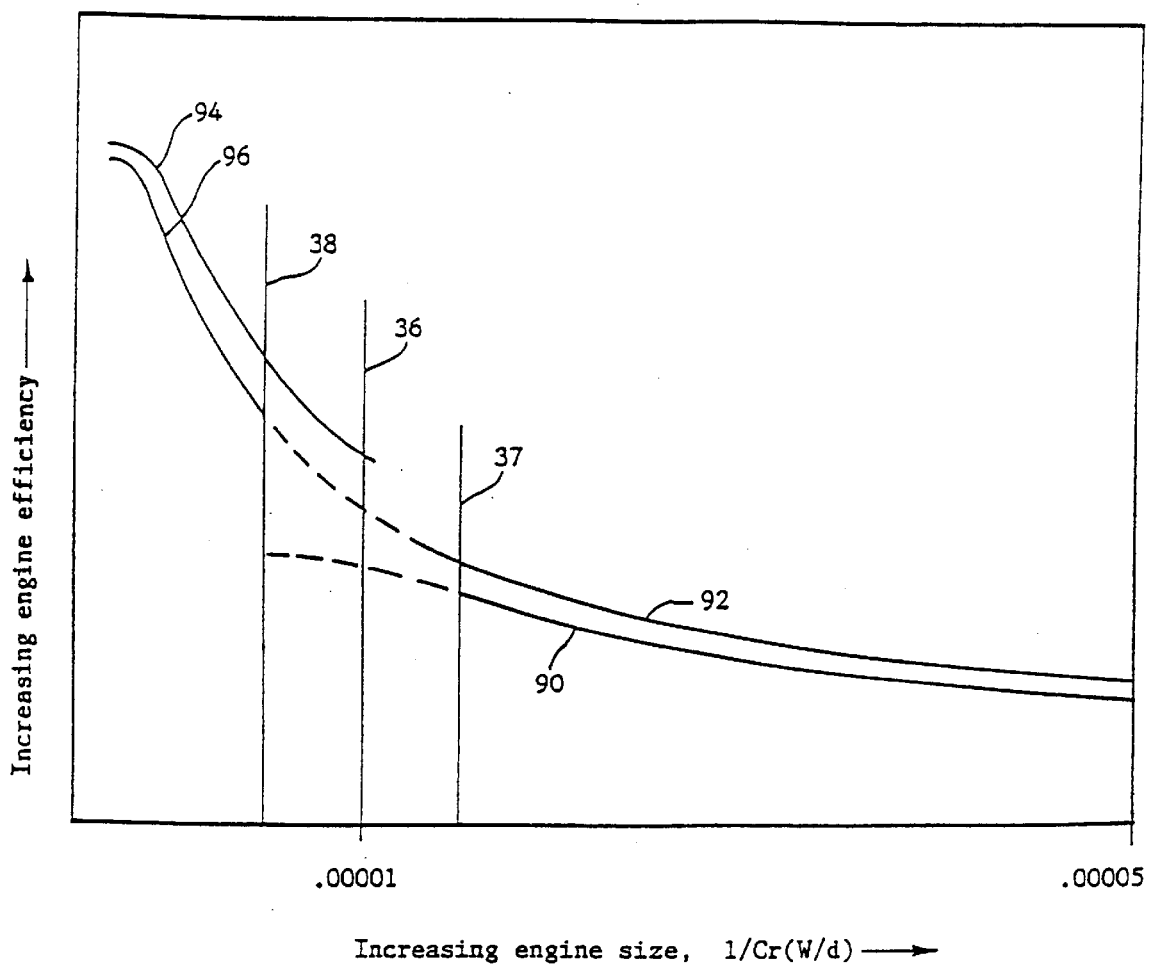
FIG. 9, already described, is a diagram relating engine size to light-load engine efficiency.

FIG. 9 shows generally the improvement in light-load engine efficiency, and thus fuel economy, realized by reducing the size of various engines in a vehicle of a given weight. The horizontal axis of FIG. 9 shows 1/Cr(W/d), which is the inverse of the property shown on the horizontal axis of FIG. 4. The vertical axis of FIG. 9 shows engine efficiency at a light power level. The approximate efficiency of naturally aspirated vehicle engines sold today in the United States is indicated by line 92, and the approximate efficiency of supercharged vehicle engines sold today in the United States is indicated by line 90. As can be appreciated from lines 92 and 90, engine efficiency increases and, therefore, fuel economy improvements realized from downsizing an engine in a vehicle of a certain weight are initially very small. This small rate of fuel economy improvement has been reported by the National Research Council and others, discussed previously. Furthermore, for each additional incremental reduction of engine size the fuel economy benefit becomes smaller than the preceding incremental reduction for supercharged engines as represented by a dashed line to the immediate left of line 90. This is due to further reduction of compression ratio and/or only moderate efficiency of commercially available superchargers.

However, for supercharged engines in which a variable compression ratio is employed, indicated by line 94, the light-load engine efficiency increases, and thus the light-load fuel economy improvements increase substantially with each incremental reduction in engine size. Furthermore, the variable compression ratio provides moderately greater efficiency at all power levels than spark-ignition hybrid vehicle primary engines 96.

As can be appreciated from FIG. 9, the fuel economy benefit of engine downsizing tapers off to the left of line 36 for supercharged vehicle engines 90. However, for supercharged vehicle engines with variable compression ratio according to the present invention, line 94, engine efficiency rises rapidly to the left of line 36. The difference in slope of lines 90 and 94 is even more pronounced to the left of line 38. Vertical line 38 represents a compression ratio times vehicle weight to combustion chamber volume ratio, Cr(W/d), of 125,000 kg/L. Referring now to FIGS. 4 and 9, hybrid vehicle engines, described previously, typically have a Cr(W/d) value of at least 125000 kg/L. Accordingly, vehicle engines according to the present invention having a Cr(W/d) value greater than 125000 kg/L have much better fuel economy than conventional vehicle engines.

Figure 5:
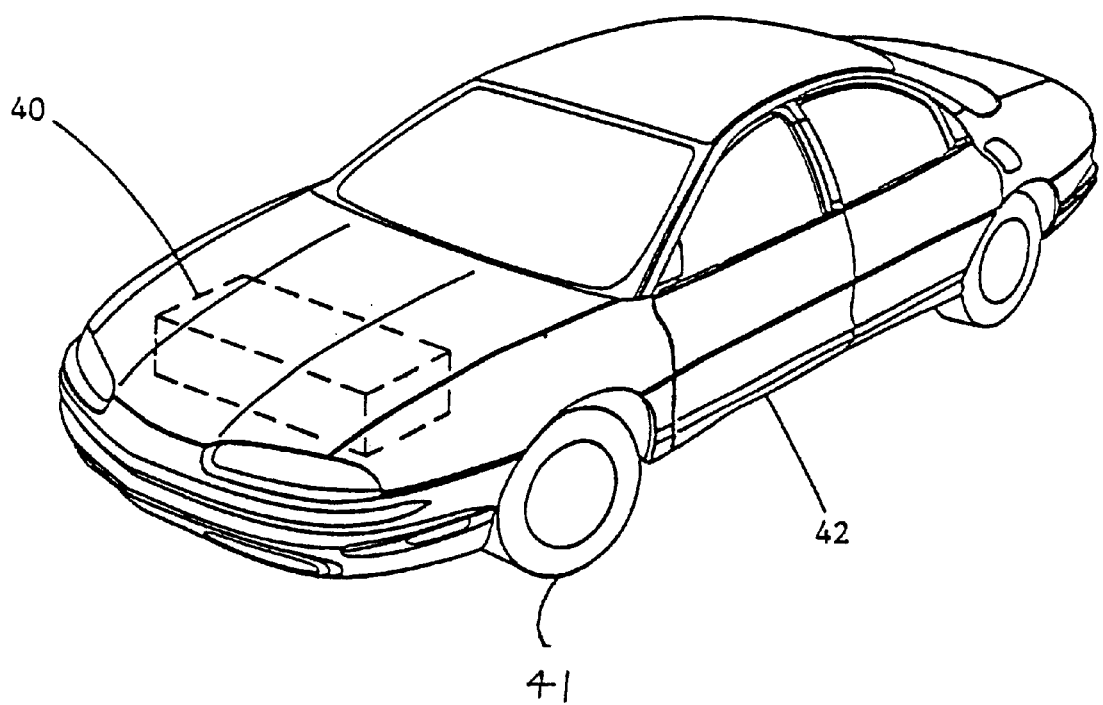
FIG. 5 is an automobile embodying the present invention.

FIG. 5 illustrates a size-optimized internal combustion engine system according to the present invention in which engine 40 is housed in vehicle 42. Engine 40 has a geometric cylinder displacement D, which is the total swept displacement of all of the firing cylinders of the engine, a minimum combustion chamber volume d, which is the minimum total clearance volume of all of the firing cylinders of the engine, and a maximum engine power output value P. The vehicle 42 has a curb weight W, which is the weight of the vehicle without passengers, cargo and fuel. The vehicle 42 may be a passenger car or light truck, such as a pickup truck, or a multi-purpose vehicle, such as a mini van or a sports-utility vehicle, and in the preferred embodiment has a curb weight of no more than 2000 kilograms. In the preferred embodiment, vehicle 42 has four or more wheels 41, and is no smaller than mass production passenger cars and light trucks currently sold in the United States, where the size of the car refers to the interior volume of the car as defined by measurement procedures currently used by the United States Environmental Protection Agency (US EPA). Specifically, the US EPA publishes the "Fuel Economy Guide" each year and publishes vehicle interior volumes for passenger cars, except two-seaters. The interior volume is given as two numbers in cubic feet (for example: 87/12). The first number is an estimate of the size of the passenger compartment. This number is based on four measurements—head room, shoulder room, hip room, and leg room—for both the front and rear seats. The second number is the size of the trunk or, in station wagons and hatchbacks, the cargo space behind the second seat. In the preferred embodiment of the present invention, vehicle 42 has an interior volume greater than 85 cubic feet of passenger compartment space plus luggage space, and in particular for vehicles having more than two seats, according to the interior volume measurement procedures currently used by the US EPA to measure passenger car interior volume.

The power of engine 40 is transmitted by a transmission to the drive wheel or drive wheels of vehicle 42. In the preferred embodiment, engine 40 is the only motive power source of the vehicle. Those skilled in the art will appreciate that according to the present invention braking energy may be captured by an electric generator or a hydraulic pump, and the captured energy used to power accessory loads such as recharging of the vehicle's electric battery, air conditioning, driving the supercharger, and/or other accessory loads. At higher cost, the braking energy may be used for motive power.

Figure 6:
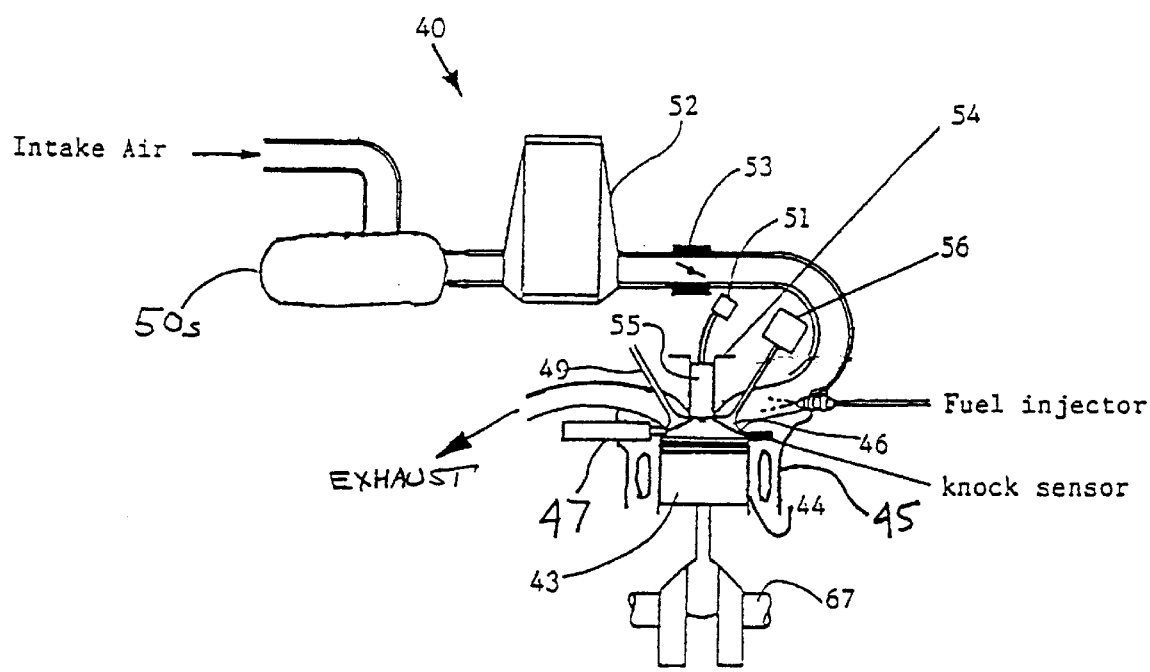
FIG. 6 shows schematically a portion of the present invention.

FIG. 6 shows schematically a portion of engine 40. A piston 43 is slidably housed within a cylinder 44 which is provided with an air/fuel mixture via an intake valve 46, which is housed in a cylinder head. In the preferred embodiment, engine 40 has one or two cylinders. Engine 40 is equipped with an optional supercharger 50s, an optional intercooler 52, a spark plug 55, one or more exhaust valves 49, and a compression ratio adjustment mechanism 54 to vary the combustion chamber volume and the compression ratio of engine 40. Those skilled in the art will appreciate that the system according to the present invention can be used with other types of variable compression ratio mechanisms. In the preferred embodiment, compression ratio adjustment mechanism 54 adjusts the compression ratio from a first position that is fixed during the intake, compression, expansion, and exhaust strokes of the engine to a second position that is fixed during the intake, compression, expansion, and exhaust strokes of the engine. Engine 40 is equipped with an optional liquid cooling jacket 45. Those skilled in the art will appreciate that engine 40 may be liquid cooled or air cooled. Engine 40 may include a controller, CPU or ECU 51 for controlling the compression ratio of engine 40. Engine 40 can be used with one or more intake and exhaust valves. Supercharger 50s can be a Lysholm supercharger or other type of supercharging means such as a Roots blower, a Ro-charger, a turbocharger, or other means for providing a volumetric efficiency greater than 1.10, where volumetric efficiency is defined on pages 53–54 in *Internal Combustion Engine Fundamentals*, J. B. Heywood, McGraw-Hill Book Company, 1988. Specifically, volumetric efficiency Ve is defined as the volume flow rate of air into the intake system of the engine divided by the rate at which volume is displaced by the piston. Ve is equal to:

$$Ve = m_a / \rho_a D$$

where $m_a$ is the mass of air inducted into the cylinders of engine 40 per two crankshaft rotations (where engine 40 is a four-stroke engine) and $\rho_a$ is the atmospheric density of the intake air. The geometric cylinder displacement D of engine 40 is equal to the product of the full stroke of piston 43 in cylinder bore 44 times the cross-sectional area of cylinder bore 44 times the number of pistons in engine 40. Those skilled in the art will appreciate that for engines having more than one cylinder, the displacement of engine 40 can be calculated individually for each firing cylinder. Engine 40 has a maximum compression ratio Cr and a minimum combustion chamber volume d which are employed during normal operation of the engine to attain high fuel economy. The piston 43 is connected to a crankshaft 67 in a conventional manner or by other functional arrangement.

The power output of engine 40 can be controlled, fully or in part, by a throttle plate 53, by an adjustable valve actuation mechanism 56 (e.g. variable valve control), by a direct gasoline fuel injection system (GDI) 47, or by another arrangement. Although three of these arrangements are shown together in FIG. 6, in many cases only one such arrangement will be present. Toyota Motor Company in Japan currently sells an adjustable valve actuation mechanism called Variable Valve Timing-intelligent (VVT-i) that adjusts the timing of valve opening and closing, and more specifically adjusts the phase relationship between the crankshaft and camshaft of their engines. Several types of adjustable valve actuation mechanisms are currently sold by a number of car companies that adjust the timing of valve opening and closing, and/or the duration (e.g. rotational period) of valve opening. Mitsubishi Motors Company currently sells GDI engines in Japan. GDI engine technology is described in *Direct Injection SI Engine Technology* SP-1314, Society of Automotive Engineers, 1998. In GDI engines, engine power output is controlled by adjusting the fuel-to-air mixture ratio of the combustion charge, and more specifically, by adjusting the amount of fuel that is injected directly into the engine cylinder.

In the preferred embodiment, during idle and light engine loads the timing of intake valve closure is delayed to largely reduce throttling and pumping losses, and modest throttling with throttle 53 is employed to provide a steady engine rotational speed. Alternatively, throttle 53 can be eliminated and the timing of intake valve closure can be continuously adjusted as needed to provide a steady rotational speed. Specifically, in a preferred embodiment of the present invention, the engine has a first setting having a power level greater than 0.015 kilowatts of actual power being used per kilogram of vehicle weight, and a second engine setting having a power level less than 0.0075 kilowatts of actual power being used per kilogram of vehicle weight, where the first setting is used during normal and high power levels, and the second setting is used during idle and during very small power levels. According to the present invention, the first setting has an intake valve closure time less than 80° after bottom dead center (ABDC) of the piston stroke in the respective cylinder, and the second setting has an intake valve closure time at least 20° greater than, that is, at least 20° later than, the intake valve closure time of the first setting. Preferably, the second setting has an intake valve closure time greater than 100° ABDC. It is difficult to determine the exact moment at which the valve closes and opens. Consequently, valve closing is defined in the present invention as the moment at which the valve lift becomes less than 0.006 inches, and valve opening is defined as the moment at which the valve lift becomes more than 0.006 inches. Delaying intake valve closing reduces the amount of air trapped in the cylinder, and reduces the pressure rise in the cylinder during the compression stroke of the piston. According to the present invention, the second engine setting has a compression ratio at least 1.5 points greater than a compression ratio of the first engine setting (for example, a compression ratio of 10.5:1 in the first setting and 12.0:1 in the second setting). The compression ratio at idle and low engine loads is increased from a value less than 11:1 to a value greater than 11:1, preferably greater than 13:1, to increase the engine's efficiency and the power output from each combustion charge. According to the present invention, a smooth idle speed can be sustained with a smaller combustion charge, in part due to the higher compression ratio and the resulting increase in power realized from the combustion charge. Reducing engine throttling and thus reducing pumping losses directly reduces crankshaft torsional vibration by reducing the deceleration of the engine's crankshaft during the intake stroke. Increasing combustion efficiency and reducing engine throttling and pumping losses indirectly reduces crankshaft torsional vibration by reducing the size of the combustion charge that is required to sustain engine idle. Consequently, the present invention provides a smooth idle without use of a large flywheel. A low inertia flywheel enables the engine to quickly rev up to higher speeds for producing high power and torque at the drive wheels of the vehicle. A fast engine response is of significant importance considering that at low speeds the small engine has insufficient power for certain driving conditions.

As stated above, the power output of engine 40 can be controlled, fully or in part, by a throttle 53, by an adjustable valve actuation mechanism 56, by a GDI 47, or by other means. GDI engines according to the present invention have a third engine setting having a power level greater than 0.055 kilowatts of actual power being used per kilogram of vehicle weight. In engines according to the present invention having GDI, the first setting has a homogeneously mixed charge having a fuel-to-air equivalence ratio (F/A) greater than 0.70, the second setting has a stratified charge having a F/A ratio less than 0.50, and the third setting has a homogeneously mixed charge having a F/A ratio that is approximately stoichiometric, e.g., between 0.95 and 1.05. Fuel-to-air equivalence ratio is defined on pages 53 and 69 to 72 in *Internal Combustion Engine Fundamentals,* J. B. Heywood, McGraw-Hill Book Company, 1988. Specifically, fuel-to-air equivalence ratio is defined as the actual fuel-to-air mass ratio divided by the stoichiometric fuel-to-air mass ratio:

$$\phi = (F/A)_{actual} / (F/A)_{stoichiometric}$$

A stoichiometric F/A mixture has an equivalence value of 1.00, and a lean F/A mixture has an equivalence value less than 1.00. According to the present invention, the second engine setting has a compression ratio at least 1.5 points greater than a compression ratio of the first engine setting, and the second engine setting has a compression ratio at least 2.5 points greater than a compression ratio of the third engine setting. With GDI, the amount of throttling required to regulate engine power is reduced. As with variable valve actuation, reducing engine throttling and thus reducing pumping losses directly reduces crankshaft torsional vibration by reducing the deceleration of the engine's crankshaft during the intake stroke.

Increasing combustion efficiency (by increasing compression ratio) and reducing engine throttling and pumping losses indirectly reduces crankshaft torsional vibration by reducing the size of the combustion charge that is required to sustain engine idle. Consequently, the present invention provides a smooth idle without use of a large flywheel, and provides an exceptionally high efficiency at light loads. A low inertia flywheel enables the engine to quickly rev up to higher speeds for producing high power and torque at the drive wheels of the vehicle. A fast engine response is of significant importance, considering that at low speeds the small engine has insufficient power for certain driving conditions. In the preferred embodiment of the present invention, the engine has one cylinder to maximize fuel economy, and includes adjustable valve actuation and variable compression ratio to provide a smooth idle and a fast response. While the preferred embodiment includes adjustable valve actuation and variable compression ratio, those skilled in the art will appreciate that according to the present invention power output can be controlled, torsional vibration can be reduced, and efficiency can be improved with adjustable valve actuation, GDI, and/or adjustable compression ratio. Those skilled in the art will also appreciate that the present invention improves the responsiveness of engines having any number of cylinders.

Figure 11:
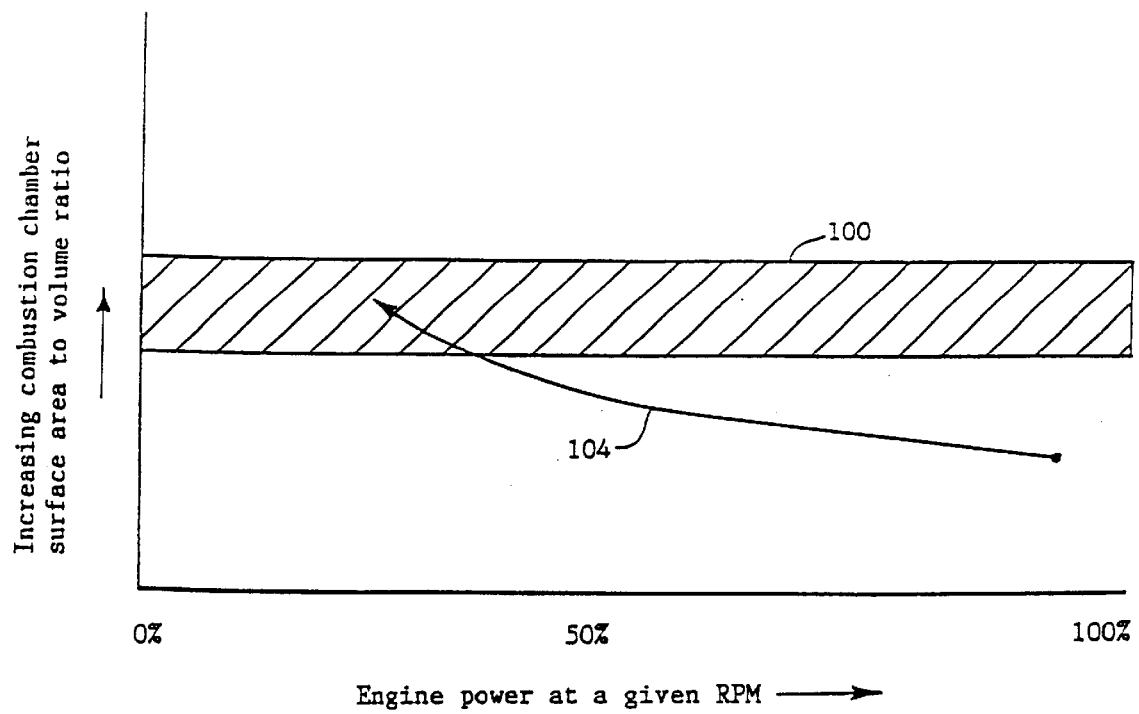

While the need for increased torque could be met by increasing the displacement of the small engine, according to the present invention the displacement of the engine is further reduced to further reduce the magnitude of the of the torsional and shaking vibration at idle and low engine speeds and to obtain an optimum efficiency. Similarly, while the need to reduce vibration could be met by increasing the cylinder count, according to the present invention, the cylinder count is reduced to one or two cylinders to provide an optimum combustion chamber surface area to volume ratio for attaining maximum engine efficiency (FIG. 11). While one and two cylinder engines have significantly greater vibration than three and four cylinder engines, the reduced size of the engine reduces the vibration of the engine relative to the size, mass, and damping of the car. The flywheel and cranktrain rotational inertia is minimized to enable the engine to quickly accelerate to a high rotational speed necessary for producing high power levels. In addition to the vibration reduction methods described above, a titanium piston connecting rod and a counter balance shaft (not shown) can be employed to reduce the shaking force of the single cylinder engine and further reduce the cranktrain's rotational inertia. As there is only one (or two) connecting rods, use of titanium is affordable. In some embodiments of the present invention, vehicle 42 has a weight and a ratio of weight to engine cylinder displacement volume D of at least 1,400 kilograms per liter. Supercharging is increased to make up for the power lost by further reductions in engine displacement. The increased heat load on the single cylinder is manageable due to cooling jacket 45 providing 360° or approximately 360° cooling coverage around cylinder 44, and superior cooling to that of current production automobile engines. The present invention may include a fast response transmission such as an electronically shift controlled geared transmission or a continuously variable transmission (CVT). The present invention is especially applicable for attaining the 80 miles per gallon fuel economy and the low cost goals of the Partnership for a New Generation of Vehicles (PNGV), a partnership between the United States government (including the U.S. Departments of Commerce, Energy, Defense et al.) and the major domestic auto makers (General Motors, Ford, and Chrysler). More generally, the present invention is especially applicable to future mass production passenger cars.

Figure 10:
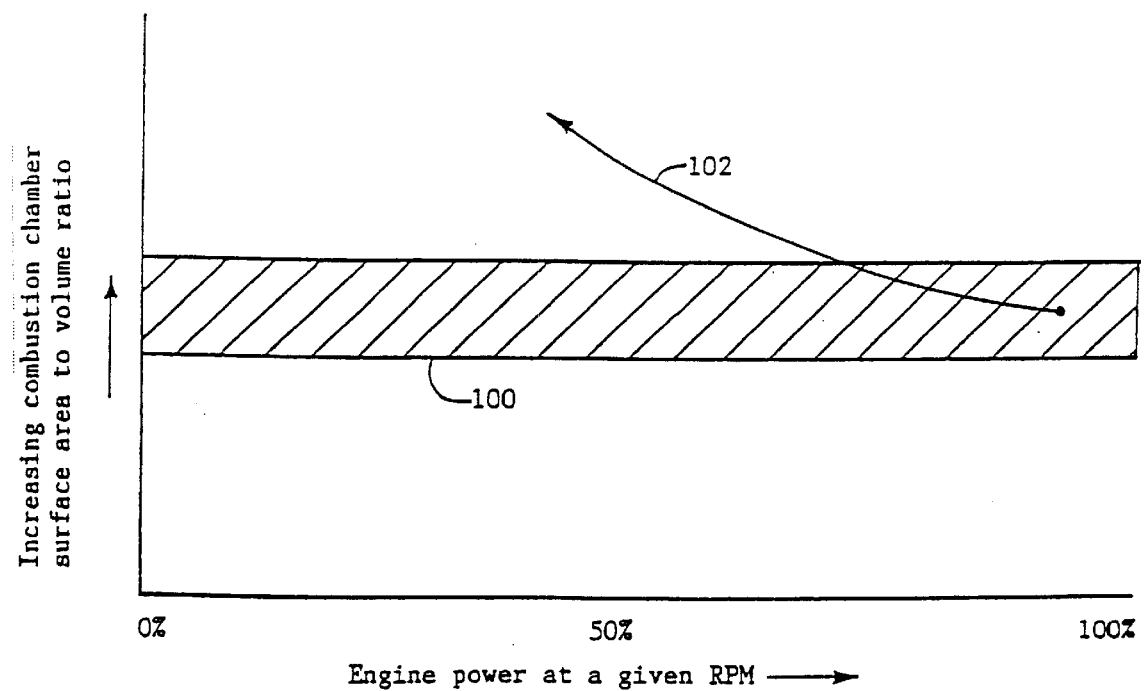
FIG. 10, already described, is a diagram relating the combustion chamber surface area of prior art variable compression ratio engines to percent of engine power output at a certain RPM, and FIG. 11, already described, is a diagram similar to that of FIG. 10 but shows generally combustion chamber surface area relative to engine power output of the present invention.

Prior art FIG. 10 shows the ratio of combustion chamber surface area to combustion chamber volume on the vertical axis, and engine power output at a certain engine speed on the horizontal axis. Combustion chamber surface area and volume are measured when piston 43 is at top dead center. The surface area to combustion chamber volume ratio of typical vehicle engines is represented by cross hatched box 100. In FIG. 10 the surface area to combustion chamber volume ratio of a prior art variable compression ratio engine is represented by line 102. As can be appreciated from FIG. 10, at light power levels, the combustion chamber surface area to volume ratio for these engines increases to a value significantly above that of typical vehicle engines 100, which results in increased heat loss from the combustion chamber, which adversely effects vehicle fuel economy.

In FIG. 11 the surface area to combustion chamber volume ratio of a variable compression ratio supercharged engine according to the present invention is represented by line 104. As can be appreciated from FIG. 11, at light power levels, e.g. less than 50% of full power at a given engine speed, the combustion chamber surface area to volume ratio for the engine according to the present invention 104 increases to a value approximately equal to that of typical vehicle engines 100. Consequently, the engine according to the present invention avoids abnormally high heat loss from the combustion chamber.

Due to its small cylinder displacement and small combustion chamber volume, at light power levels, the engine according to the present invention will operate approximately as efficiently as a hybrid vehicle's primary engine. The combustion chamber has a favorable surface area to volume ratio and the geometry of the chamber is optimum for attaining high light-load engine efficiency. Moreover and consequently, mechanical friction and heat loss are at a minimum relative to engine power output.

At high power levels, the supercharger 50s and the variable compression ratio mechanism 54 are employed to increase the maximum power output of the engine 40. At high loads, the supercharger 50s delivers a large mass flow of air to engine 40. The variable compression ratio mechanism 54 is employed to increase the volume of the combustion chamber in order to avoid engine knock and/or to limit the maximum pressure of the combustion charge.

Figure 7:
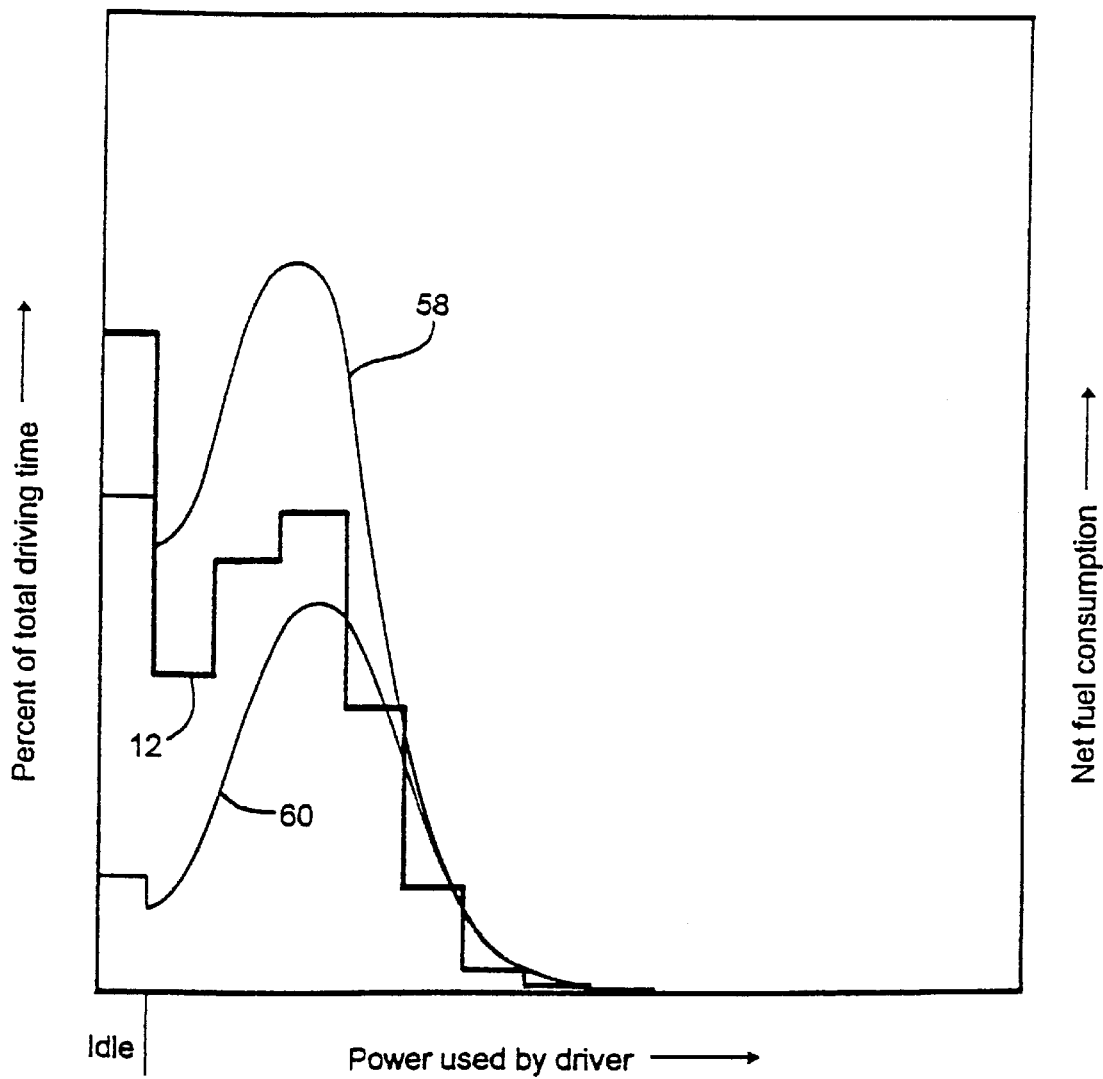
FIG. 7 is a diagram showing approximate fuel consumption levels of the present invention relative to engine power output.

As can be seen in FIG. 7, the fuel economy benefit of engine and combustion chamber size reduction is significant. The percent of total driving time spent at a given engine power level for a typical driver and typical passenger car is illustrated by the stepped curve 12 (also shown in FIG. 2) which is read from the left ordinate axis. Engine power output is read from the horizontal axis. Line 58 indicates the net fuel consumption of the prior art engine represented by line 14 in FIG. 1. Line 60 represents net fuel consumption of the present invention represented by line 16 in FIG. 2. Net fuel consumption is read from the right ordinate axis. The area between the line 58 and 60 is an indication of the fuel savings of the engine of the present invention over the prior art engine. The variable compression ratio supercharged engine of the present invention is expected to attain up to approximately 100% better fuel economy than typical spark ignition vehicle engines in the same automobile during urban driving, and up to approximately 60% better fuel economy than the most efficient spark ignition passenger car engines sold today.

As can be seen from FIG. 2, the engine 40 according to the present invention operates at high efficiency at light loads. This is due to its small size and relatively small internal engine friction losses at light loads. Furthermore, as can be seen from FIG. 8, the variable compression ratio mechanism 54 (FIG. 6) is employed at light power levels to further increase compression ratio and, thus, further increase thermodynamic efficiency. Engine power actually used by the vehicle driver divided by vehicle weight, Pu/W, in units of kilowatts per kilogram is shown on the horizontal axis of FIG. 8, and engine compression ratio is shown on the vertical axis. At power levels below 0.0075 kW/kg, e.g. Zone 1, the engine according to the present invention has a compression ratio greater than 11:1 in order to attain high light load efficiency. Furthermore, typically in Zone 1, no boost pressure is supplied to engine 40. The value of 0.055 kW/kg on the horizontal axis of FIG. 8 corresponds to line E in FIG. 3, which indicates generally the minimum power capability and thus acceleration for passenger car vehicle engines sold today in the United States. At power levels greater than 0.055 kW/kg, the supercharger 50s and the variable compression ratio mechanism 54 are employed to increase the maximum power output of the engine 40. At high loads, the supercharger 50s delivers boost pressure and a large mass flow of air to the engine 40. The variable compression ratio mechanism 54 is employed to increase the volume of the combustion chamber in order to avoid engine knock and/or to limit the maximum pressure of the combustion charge. At power levels above 0.055 kW/kg, e.g. Zone 2, the engine according to the present invention, operating on regular unleaded 87 octane gasoline, using the (R+M)/2 octane determination method, has a compression ratio less than 8.5:1. Higher octane fuels and improved combustion chamber design enable higher compression ratios to be employed in both Zone 1 and Zone 2. In general, in order to provide high light load efficiency and sufficient maximum power without engine knock, the compression ratio will be at least 2.5 points lower at the ratio of 0.055 kilowatts of power actually used per kilogram of vehicle weight than at 0.0075 kilowatts of power actually used per kilogram of vehicle weight, e.g. a compression ratio of 11:1 in Zone 1 will be reduced at least to a compression ratio of 8.5 in Zone 2.

Figure 8:
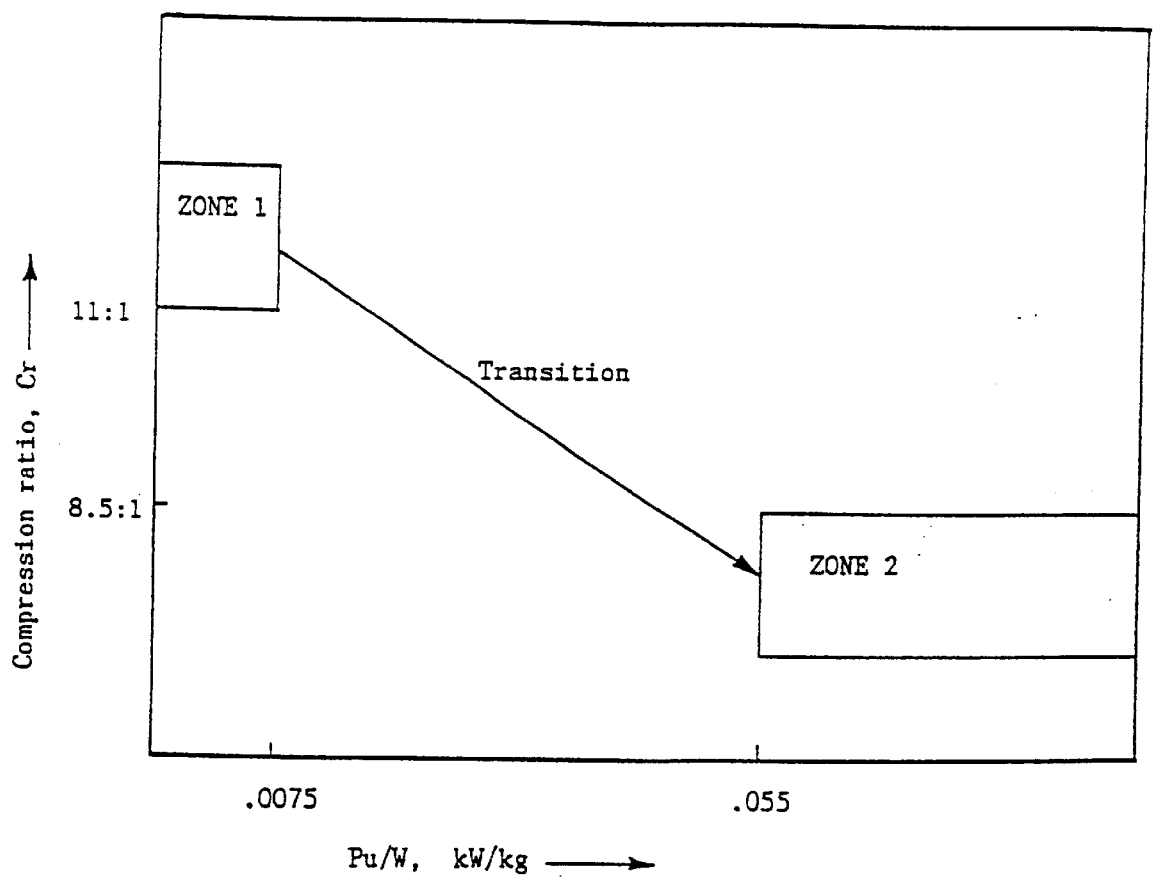
FIG. 8 is a diagram showing adjustment of compression ratio for increasing light load vehicle fuel economy according to the present invention.

The horizontal axis of FIG. 8 is shown on the upper horizontal axis of FIG. 2. Dot 106 indicates an engine efficiency of 27% at a power to vehicle weight ratio Pu/W of 0.0075 kW/kg, and dot 108 indicates an engine efficiency of 32% at a power to vehicle weight ratio Pu/W of 0.015 kW/kg. FIG. 2 shows brake engine efficiency calculated using the lower heating value of the fuel and the brake power of the engine. Vehicle engines having variable compression ratio, according to the present invention, represented generally by line 16 have a light load efficiency greater than 27% at a Pu/AW level less than 0.0075 kW/kg. Similarly, vehicle engines according to the present invention represented generally by line 16 have a light load efficiency greater than 32% at a Pu/W level less than 0.015 kW/kg.

As can be appreciated from FIG. 9, engine efficiency increases and, therefore, fuel economy improvements realized from downsizing a vehicle engine in a vehicle of a certain weight are initially very small. Furthermore, the efficiency increases realized from downsizing a turbocharged engine become smaller, and of less or no value, with each incremental reduction of engine size. Consequently, the cost to benefit ratio of engine downsizing with turbocharging is poor.

However, for supercharged engines in which variable compression ratio is employed, the light-load fuel economy improvements increase substantially with each incremental reduction in engine displacement.

While the invention has been described in terms of a single preferred embodiment, those skilled in the art will recognize that the invention can be practiced with modification within the spirit and scope of the claims.

What is claimed is:

1. A high-efficiency vehicle and engine, wherein the vehicle has at least four wheels, comprising:
    a body; and
    a reciprocating piston four-stroke spark-ignition internal-combustion engine connected to said body to provide power for moving the vehicle, said engine having at least one reciprocating piston slidably mounted in a cylinder, a crankshaft, a connecting rod for linking the reciprocating piston to the crankshaft, an engine cylinder displacement volume, a compression ratio, a maximum power output and a compression ratio adjustment mechanism to vary the combustion chamber volume;
    wherein the engine has fewer than three of said reciprocating pistons, and the vehicle has an engine maximum power output to vehicle weight ratio of at least 0.055 kilowatts of engine power per kilogram of vehicle weight and a maximum engine power to engine cylinder displacement ratio of at least 80 kilowatts per liter.

2. The high-efficiency vehicle and engine of claim 1, wherein the engine has a volumetric efficiency greater than 1.10.

3. The high-efficiency vehicle and engine of claim 1, wherein the engine includes means for supercharging the engine.

4. The high-efficiency vehicle and engine of claim 1, wherein the vehicle has a weight and a ratio of weight to engine cylinder displacement volume of at least 1,200 kilograms per liter.

5. The high-efficiency vehicle and engine of claim 1, wherein the body has an interior volume, including a passenger compartment space and a luggage space, of at least 85 cubic feet.

6. The high-efficiency vehicle and engine of claim 1, wherein the engine has valves, including at least one intake valve, for controlling the flow of fluids into and out of the cylinder and means for varying the timing of closure of the intake valve relative to the position of the piston in the cylinder.

7. The high-efficiency vehicle and engine of claim 1, wherein the engine has an efficiency greater than 32% at a ratio of the actual power being used to the weight of the vehicle less than 0.015 kilowatts per kilogram.

8. The high-efficiency vehicle and engine of claim 1, wherein the engine is the only motive power source of the vehicle.

9. The high-efficiency vehicle and engine of claim 1, wherein the engine has only one reciprocating piston.

10. A high-efficiency vehicle and engine, wherein the vehicle has at least four wheels, comprising:
    a body; and
    a reciprocating piston four-stroke spark-ignition internal-combustion engine connected to said body to provide power for moving the vehicle, said engine having at least one reciprocating piston slidably mounted in a cylinder, a crankshaft, a connecting rod for linking the reciprocating piston to the crankshaft, an engine cylinder displacement volume, a maximum power output, valves controlling the flow of fluids into and out of the cylinder, said valves including at least one intake valve, and means for varying the timing of closure of the intake valve relative to the position of the piston in the cylinder,
    wherein the engine has fewer than three of said reciprocating pistons, and the vehicle has an engine maximum power output to vehicle weight ratio of at least 0.055 kilowatts of engine power per kilogram of vehicle weight, a weight and a ratio of weight to engine cylinder displacement volume of at least 1,200 kilograms per liter.

11. The high-efficiency vehicle and engine of claim 10, wherein the engine has a maximum engine power to engine cylinder displacement ratio of at least 80 kilowatts per liter.

12. The high-efficiency vehicle and engine of claim 10, wherein the engine has a volumetric efficiency greater than 1.10.

13. The high-efficiency vehicle and engine of claim 10, wherein the engine includes means for varying compression ratio.

14. The high-efficiency vehicle of claim 10, wherein the engine includes means for supercharging the engine.

15. The high-efficiency vehicle of claim 10, wherein the engine has only one reciprocating piston.

16. The high-efficiency vehicle of claim 10, wherein the engine is the only motive power source of the vehicle.

17. The high-efficiency vehicle and engine of claim 10, wherein the body has an interior volume, including a passenger compartment space and a luggage space, of at least 85 cubic feet.

18. A method for increasing the efficiency of, and for reducing the torsional vibration of, a reciprocating piston four-stroke spark-ignition internal combustion engine having a maximum power, a cylinder displacement, a compression ratio, a ratio of maximum power to cylinder displacement greater than 80 kilowatts of power per liter of cylinder displacement, means for supercharging the engine, means for adjusting the compression ratio, at least one intake valve, and means for adjusting the timing of intake valve closure, in a vehicle having a weight, an engine maximum power output to vehicle weight ratio of at least 0.055 kilowatts of engine power per kilogram of vehicle weight, a first engine setting having a power level greater than 0.015 kilowatts of actual power being used per kilogram of vehicle weight, and a second engine setting having a power level less than 0.0075 kilowatts of actual power being used per kilogram of vehicle weight, comprising:

adjusting the timing of intake valve closure from a first timing setting having a value less than 80° after bottom dead center of the piston stroke to a second timing setting having a value more than 20° greater than the value in the first timing setting, and increasing the compression ratio by at least 1.5 points.

19. The method of claim 18, wherein the second timing setting has an intake valve closure value greater than 100° after bottom dead center.

20. The method of claim 18, further comprising providing a compression ratio less than 11 at the first engine setting, and providing a compression ratio greater than 11 at the second engine setting.

21. A method for increasing the efficiency of, and for reducing the torsional vibration of, a reciprocating piston four-stroke spark-ignition internal combustion engine having at least one cylinder, a maximum power, a cylinder displacement, a compression ratio, a ratio of maximum power to cylinder displacement greater than 80 kilowatts of power per liter of cylinder displacement, means for supercharging the engine, means for adjusting the compression ratio, means for fuel injection directly into the cylinder, and a fuel-to-air equivalence ratio, in a vehicle having a weight, an engine maximum power output to vehicle weight ratio of at least 0.055 kilowatts of engine power per kilogram of vehicle weight, a first engine setting having a power level greater than 0.015 kilowatts of actual power being used per kilogram of vehicle weight, and a second engine setting having a power level less than 0.0075 kilowatts of actual power being used per kilogram of vehicle weight, comprising:

adjusting the fuel-to-air equivalence ratio from a first setting having a fuel-to-air equivalence ratio value greater than 0.70 to a second setting having a fuel-to-air equivalence ratio value less than 0.50, and increasing the compression ratio by at least 1.5 points.

22. The method of claim 21, wherein the vehicle has a third engine setting having a power level greater than 0.055 kilowatts of actual power being used per kilogram of vehicle weight, further comprising:

adjusting the fuel-to-air equivalence ratio from its second setting of less than 0.50 to a third setting of greater than 0.95, and increasing the compression ratio by at least 2.5 points.

* * * * *